United States Patent [19]

Kayser

[11] 4,242,569

[45] Dec. 30, 1980

[54] MULTIPLE TANK ELECTRIC WATER HEATER

[76] Inventor: William M. Kayser, 6408-81st Ave. N., Minneapolis, Minn. 55445

[21] Appl. No.: 899,472

[22] Filed: Apr. 24, 1978

[51] Int. Cl.³ .................. H05B 1/02; F24H 1/20
[52] U.S. Cl. ........................ 219/314; 55/80;
62/93; 126/101; 126/361; 126/362; 219/279;
219/325; 219/330; 219/331; 237/19
[58] Field of Search ............... 219/312, 314, 306, 341,
219/325, 326, 328, 310, 331, 365, 279; 34/86;
126/362, 101, 361; 55/80; 62/93; 237/19;
165/104 R, 104 S, 108, 132

[56] References Cited

U.S. PATENT DOCUMENTS

| | | | |
|---|---|---|---|
| 745,499 | 12/1903 | Jarman | 165/132 |
| 929,574 | 7/1909 | Fredrickson | 122/189 |
| 1,047,389 | 12/1912 | Cooper | 219/314 |
| 1,253,118 | 1/1918 | Averitt | 165/132 |
| 1,674,369 | 6/1928 | McQuinn | 219/314 |
| 1,767,122 | 6/1930 | Dean | 219/314 X |
| 1,963,367 | 6/1934 | Ingison | 219/314 |
| 2,127,732 | 8/1938 | Heitman | 165/132 X |
| 2,225,023 | 12/1940 | Watt | 126/101 X |
| 2,268,789 | 1/1942 | Watt | 126/101 X |
| 2,285,998 | 6/1942 | Morrison et al. | 165/132 |
| 2,386,949 | 10/1945 | Hayward | 219/314 |
| 2,455,988 | 12/1948 | Fife | 126/101 X |
| 2,715,177 | 8/1955 | Pfingsten | 219/283 |
| 2,742,560 | 4/1956 | Liebhafsky | 219/314 |
| 2,889,139 | 6/1959 | Hedberg | 165/132 |
| 3,050,867 | 8/1962 | Friedman | 34/86 |
| 3,237,684 | 3/1966 | Morgan | 165/132 X |
| 3,251,139 | 5/1966 | Strimling | 165/108 |
| 3,269,382 | 8/1966 | Ronan et al. | 126/101 |
| 3,330,332 | 7/1967 | Warner | 165/26 |
| 3,617,700 | 11/1971 | Hooper | 219/314 |
| 3,955,556 | 5/1976 | Pangborn et al. | 126/362 |
| 4,082,143 | 4/1978 | Thomason | 165/104 S |
| 4,112,281 | 9/1978 | Epps | 219/341 X |

FOREIGN PATENT DOCUMENTS

| | | | |
|---|---|---|---|
| 1341893 | 9/1963 | France | 219/314 |
| 199855 | 7/1923 | United Kingdom | 219/314 |

OTHER PUBLICATIONS

"Study of Energy Saving Options for Refrigerators and Water Heaters, vol II Water Heaters" Arthur D. Little, Inc., Cambridge, Massachusetts, For Federal Energy Administration, National Technical Information Service, PB-269154, (May, 1977), pp. 97-100.

"Solar Water Heater Package Uses Unique Design Approaches" by Charles W. Behrens, Appliance Manufacturer, Feb. 1978, pp. 80-82.

"Rheem Solaraide" advertising brochure, Rheem Water Heater Division, City Investing Co., 7600 S. Kedzie Ave., Chicago, Ill. 60652, 1978.

Primary Examiner—A. Bartis
Attorney, Agent, or Firm—Kinney, Lange, Braddock, Westman and Fairbairn

[57] ABSTRACT

A hot water heater includes inner and outer tanks for holding water. The tanks are interconnected in such a manner that the cold water is received in the outer tank prior to flowing into the inner tank to be heated. Hot water is drawn from the inner tank for use. A heating element is located within the inner tank for heating the water within the inner tank. The cooler water in the outer tank surrounds the inner tank and thermally insulates the water in the inner tank from the outside environment. Any heat losses from the inner tank heat the cooler water in the outer tank, which is ultimately supplied to the inner tank for heating.

Temperature sensors are provided within the inner tank and the outer tank, and a third temperature sensor senses ambient temperature of the room air outside of the outer tank. A fan directs ambient room air against the outerwall of the outer tank to provide heating of the water within the outer tank, which is cooler than ambient room temperature. A control controls the heating of the water within the inner tank as a function of the differential between the temperature sensed in the inner and outer tanks, and controls the operation of the fan as a function of the differential between the temperatures of the water within the outer tank and ambient room temperature.

6 Claims, 2 Drawing Figures

MULTIPLE TANK ELECTRIC WATER HEATER

BACKGROUND OF THE INVENTION

The present invention relates to hot water heaters. In particular, the present invention relates to a hot water heater having multiple tanks containing water of different temperatures.

Nearly all modern residences and business establishments have a hot water heater in which water is heated to provide hot water for washing, cleaning, and bathing. In general, most hot water heaters have a tank which is thoroughly thermally insulated. This reduces as much as possible the loss of heat from the heated water within the tank to the surrounding atmosphere. In addition, it prevents the danger of burns by a person accidentally touching the outer surface of the water heater.

In most hot water heaters, the supply of water to the hot water heater is cold water provided by a well or a city water system. This water may be very cold, particularly during winter months, and requires large amounts of energy to raise its temperature to the desired temperature.

SUMMARY OF THE INVENTION

The hot water heater of the present invention includes a first or outer tank and a second or inner tank within the first tank. The first tank has a first inlet for receiving cold water which must be heated. The second tank has a second inlet which receives water from a first tank and has a hot water outlet for supplying hot water from within the second tank. Heating means are located within the second tank for heating the water within the second tank.

The hot water heater of the present invention also includes means for directing air having a temperature greater than the temperature of the water within the first tank against the outer wall of the first tank. The directing of the air, therefore, causes heating of the water within the first tank. The present invention also preferably includes first, second and third temperature sensing means for sensing temperature of the water within the first tank, water within the second tank, and the air to be directed against the outer wall of the first tank, respectively. Operation of the heating means is controlled as a function of the temperature sensed by the first and second temperature sensing means, and operation of the means for directing air against the outer wall is controlled as a function of the differential between the temperature sensed by the first and third temperature sensing means.

The present invention has several important advantages. First, the outer tank need not be insulated from the external surroundings since the heating occurs within the inner tank. Second, any heat loss which might occur from the inner tank merely heats the cold water within the outer tank. This water will ultimately be introduced at the cold water inlet of the inner tank and, therefore, merely decreases the amount of energy which will be required when that water is introduced into the inner tank.

DETAILED DESCRIPTION OF THE PREFERRED EMBODIMENTS

Figure 1:
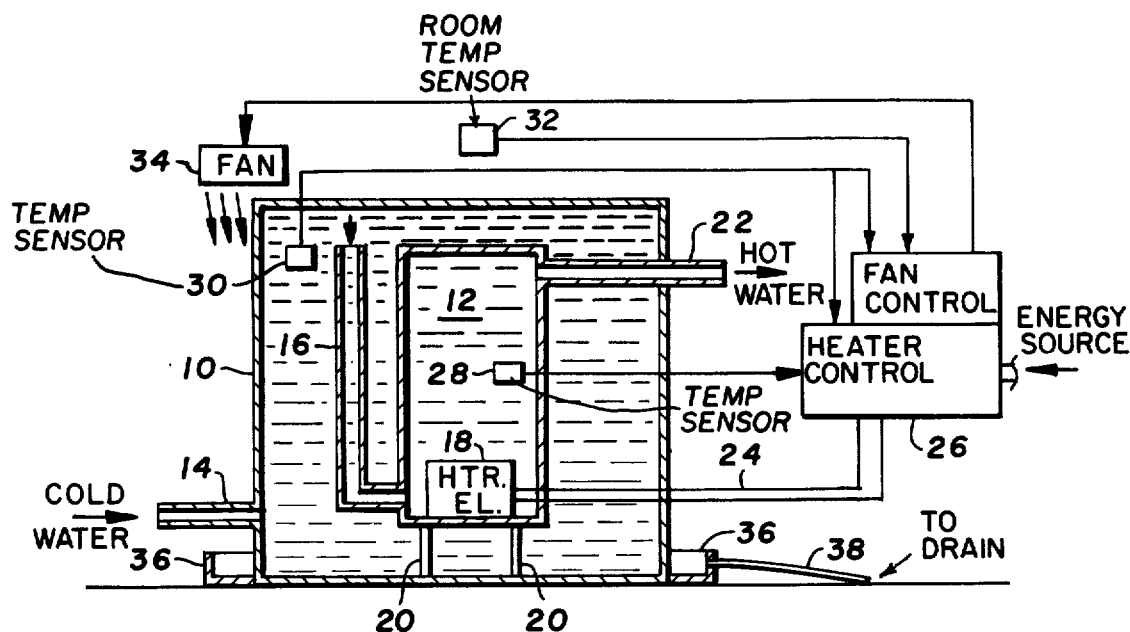
FIG. 1 shows a preferred embodiment of the hot water heater of the present invention.

In the embodiment shown in FIG. 1, the hot water heater of the present invention includes an outer cold water tank 10 and an inner hot water tank 12. Outer tank 10 receives cold water through cold water inlet 14. The water within outer tank 10 surrounds inner hot water tank 12 and provides thermal insulation between inner tank 12 and the outer surroundings.

Hot water tank 12 has an inlet 16 which receives cooler water from within tank 10. In the preferred embodiment shown in FIG. 1, the water from outer tank 10 is received by inlet 16 near the top of inner tank 10, so that the water taken in to inner tank 12 is the hottest water within outer tank 10. This water is supplied to the inner tank near the bottom of inner tank 12.

Positioned within inner tank 12 is a heater element 18, which heats the water within tank 12. Heater element 18, which may be a conventional electric or gas heating element, is isolated from the exterior surroundings of the walls of inner tank 12 and the water within outer tank 10. The walls of inner tank 12 may be partially insulated so that most of the heat from heater element 18 is used only to heat the water within tank 12. However, any heat losses from inner tank 12 are not lost to the surrounding atmosphere. Instead, that heat is used to heat the water within outer tank 10, which is ultimately supplied through inlet 16 to inner tank 12. It should be noted that in the preferred embodiment shown in FIG. 1, spacer feet 20 space inner tank 12 off the bottom of tank 10 so that inner tank 12 is surrounded on all sides by water within outer tank 10.

The hot water is extracted from inner tank 12 through hot water outlet 22. The hot water is taken from near the top of inner tank 12 so that the water being supplied is the hottest water available within inner tank 12.

Energy is supplied to heater element 18 through conduit or pipe 24. This energy may be in the form of gas or electricity. The supply of energy to heater element 18 is controlled by control 26. In one preferred embodiment, control 26 is an electrical control circuit which receives signals from temperature sensors 28, 30, and 32. The signals from sensors 28, 30, and 32 represent the temperatures of the water within inner tank 12, the water within outer tank 10, and the temperature of the surrounding environment, respectively. Control 26 controls heater element 18 as a function of the temperature differential between the cold water within outer tank 10 and the hot water within inner tank 12, rather than merely controlling heater element 18 as a function of the temperature of the hot water in tank 12. As the temperature of cold water within outer tank 10 rises, control 26 reduces the amount of heat being supplied by heater element 18 to the hot water in anticipation of the intake of water from outer tank 10 which has already warmed somewhat.

In FIG. 1, fan 34 blows air onto the side walls of outer tank 10. As shown in FIG. 1, the operation of fan 34 is controlled by control 26 based upon the differential between the temperature of the cold water within tank 10 and the ambient temperature sensed by sensor 32. As the temperature within tank 10 approaches ambient temperature, operation of fan 34 is reduced or stopped entirely.

The air blown upon the side walls of tank 10 by fan 34 tends to accelerate the warming of the water within tank 10 to ambient temperature. In the process, it also tends to cause some condensation from the outer walls of tank 10. This produces a dehumidification effect, which is advantageous, since the hot water heater is generally located in a damp basement of a residence. As shown in FIG. 1, drip pan 36 collects water which is condensed on the outer walls of tank 10, and tubing 38 drains water within pan 36 to a suitable drain (not shown).

Figure 2:
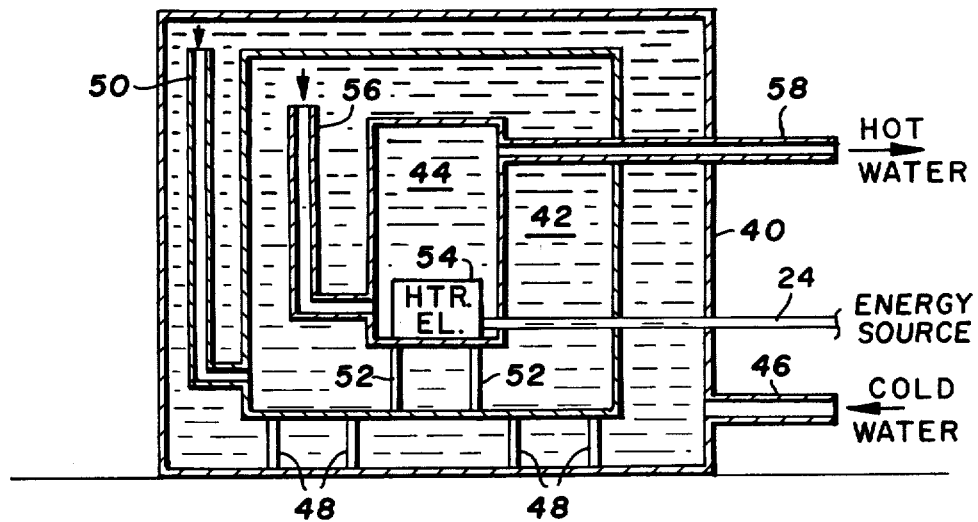
FIG. 2 shows another embodiment of the present invention using two outer tanks and an inner tank.

FIG. 2 shows another embodiment of the hot water heater of the present invention. As shown in FIG. 2, the hot water heater includes three tanks 40, 42, and 44. Tank 40 is the outer most tank and receives cold water through cold water inlet 46. The water within tank 40 completely surrounds intermediate tank 42, which is spaced from the bottom of tank 40 by feet 48. Tank 42 has an inlet 50 which receives water from near the top of tank 40 and supplies that water to tank 42 near the bottom thereof.

The water in intermediate tank 42 completely surrounds inner tank 44, which is spaced from the bottom of intermediate tank 42 by feet 52 and which contains heater element 54. Water enters tank 44 through intake 56, and hot water is removed from tank 44 through hot water outlet 58.

The embodiment shown in FIG. 2 illustrates how a series of tanks may be used in accordance with the present invention. The water within intermediate tank 42 is warmer than the water in outer tank 40 which surrounds it. Similarly, the water within inner tank 44 is much warmer than the water within intermediate tank 42. This arrangement gives the water an opportunity to warm before reaching inner tank 44, where it is actually heated by heater element 52. In addition, the water in tanks 42 and 40 provide additional thermal insulation and insulates hot water within tank 44 from the outside environment.

It can be seen, therefore, that the present invention has several important advantages. First, the water in the outer tank or tanks provides thermal insulation and energy saving since any heat losses from the inner tank merely heats the water within the outer tank or tanks.

Second, the hot water heater of the present invention is no more expensive and potentially less expensive to fabricate than the prior art hot water heaters. Since the water within the outer tank or tanks thermally insulates the hot water within the inner tank from the outside environment, less insulation for the inner tank is required. Little or no thermal insulation is required for the outer tank or tanks, since the cold water being supplied to the outermost tank is usually twenty degrees or more colder than the room temperature. Since the purpose is ultimately to heat the water, there is no reason not to allow the cold water within the outermost tank from being heated by the outside environment. In addition, the heater element and the inner tank may be smaller than the conventional hot water tank and heater element since it does not have to heat water from near freezing temperatures all the way up to near boiling.

Third, the cold water within the outer tank can be used to provide dehumidification while it is warming to near room temperature. For example, if the cold water received from the cold water inlet is at about 45° to 50° F. and the ambient temperature of the air in the room is in the range of 65° to 70° F., the water within the outer tank will begin to warm toward room temperature provided it is allowed to stand long enough. This would certainly be the case overnight and possibly during certain periods of the day, when the demand for hot water is at or near zero. The energy cost of this dehumidification is very low, since it is occurring due to heat transfer between the water in the outer tank and the outside environment. The only additional energy required is if a fan is used for forcing the air past the walls of the outer tank.

To illustrate the energy savings which are potentially possible, consider a hot water heater using approximately 100 gallons per day. This would correspond to approximately 800 pounds of water. If these 800 pounds of water are permitted to warm from approximately 45° F. to approximately 65° F. in the outer tank before being heated in the inner tank, this corresponds to a 20° F. temperature increase for the 800 pounds of water. This is the equivalent of 16,000 BTU's which would not have to be supplied by the heater element, but rather are supplied by the outside room environment.

In addition to the savings of energy by allowing the cold water to warm to room temperature before being heated, the dehumidification due to condensation on the outer wall of the outside tank is also significant. The heat of vaporization of water is approximately 972 BTU's per pound. If the entire 16,000 BTU's were available for dehumidification, approximately two gallons of water could be condensed on the walls of the outer tank per day. While the actual cost savings of the present invention may be somewhat less than these figures, due to non-ideal conditions and due to variations in size of the tanks, hot water demand, and the like, it is clear that energy saving is achieved both in reducing the BTU's which must be supplied by the heater element to heat the water and by providing dehumidification at no additional energy cost.

The energy saving and dehumidification described above is based upon ideal conditions, and actual savings may be somewhat less due to non-ideal conditions and variations in size of the tanks, hot water demand, and the like. The actual energy saving and dehumidification are, of course, dependent upon two important conditions: (1) the inlet water temperature must be below room temperature; and (2) the water from the hot water heater system must be used so that fresh cold water flows to the outer tank. The outermost shell or tank will radiate energy (i.e. lose efficiency) only if its temperature is higher than the surrounding environment. In most climates, the room temperature will be warmer than the fresh inlet water temperature so long as the water within the tank is used at a reasonable rate. Removing the partially warmed water from the outer chamber of the tank and replacing it with fresh cold water tends to produce this condition in direct proportion to the coldness of the incoming water, the quantity of water being extracted from the hot water heater, and the frequency of use. These same factors are the ones which contribute most heavily to energy consumption so that the greatest efficiency occurs at the times of greatest energy usage. The amounts of heat added to the outer tank from the inner tank and from the room air depends upon a number of factors including: (1) the insulating property of the materials used as the partitions; (2) the number of partitions; (3) the temperature differential between the partitions; and (4) the temperature differential between the water in the outermost chamber and the environment.

In conclusion, the present invention is an improved hot water heater which has significant advantages over the prior art of water heaters. Although the present invention has been described with reference to preferred environment, workers skilled in the art will recognize that changes may be made in form and detail without departing from the spirit and scope of the invention. For example, although one embodiment of the present invention is shown with temperature sensors and an external control, the control may be located within the tank itself and greater or fewer temperature sensors may be used. Similarly, although embodiments are shown using two and three tanks, hot water heaters using even more tanks may be constructed in accordance with the present invention.

What is claimed is:

1. A hot water heater comprising:
    a first tank for holding water and having a first inlet;
    a second innermost tank within the first tank for holding water and having a second inlet for receiving water from the first tank and having a hot water outlet for supplying hot water from within the second innermost tank to a point of utilization outside of the hot water heater;
    heating means located within the second innermost tank for heating the water within the second innermost tank;
    first temperature sensing means for sensing temperature of the water within the first tank;
    second temperature sensing means for sensing temperature of the water within the second tank;
    fan means for directing ambient room air against an outer wall of the first tank;
    third temperature sensing means for sensing ambient temperature of the room air outside of the first tank;
    control means for controlling the heating means as a function of the temperature differential between the temperatures sensed by the first and second temperature sensing means, and for controlling the operation of the fan means as a function of the differential between the temperatures sensed by the first and third temperature sensing means; and
    means for collecting and disposing of water condensed on the outer wall of the first tank.

2. The hot water heater of claim 1 and further comprising:
    spacer means for spacing the second tank from the walls of the first tank so that the second tank is surrounded on all sides by water within the first tank.

3. The hot water heater of claim 1 or 2 wherein the first inlet supplies water to the first tank near the bottom of the tank.

4. The hot water heater of claim 3 wherein the second inlet receives water from the first tank near the top of the first tank and supplies the water to the second tank near the bottom of the second tank.

5. The hot water heater of claim 4 wherein the hot water outlet supplies water from near the top of the second tank.

6. A hot water heater comprising: p1 a first tank for holding water and having a first inlet and a heat transmitting outer wall;
    a second innermost tank within the first tank for holding water and having a second inlet for receiving water from the first tank and having a hot water outlet for supplying hot water from within the second innermost tank to a point of utilization outside of the hot water heater;
    heating means located within the second innermost tank for heating the water within the second innermost tank;
    means for directing air having a temperature greater than the temperature of the water within the first tank against the outer wall of the first tank to heat the water within the first tank;
    first temperature sensing means for sensing temperature of the water within the first tank;
    second temperature sensing means for sensing temperature of the water within the second tank;
    third temperature sensing means for sensing temperature of the air directed against the outer wall of the first tank; and
    control means for controlling the heating means as a function of the temperature differential between the temperatures sensed by the first and second temperature sensing means, and for controlling the means for directing air as a function of the differential between the temperatures sensed by the first and third temperature sensing means.

* * * * *